United States Patent
Yao et al.

(10) Patent No.: US 7,514,678 B2
(45) Date of Patent: Apr. 7, 2009

(54) PROBE FOR SCANNING THERMAL MICROSCOPE

(75) Inventors: Yuan Yao, Beijing (CN); Chang-Hong Liu, Beijing (CN); Shou-Shan Fan, Beijing (CN)

(73) Assignees: Tsinghua University, Beijing (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 378 days.

(21) Appl. No.: 11/448,565

(22) Filed: Jun. 7, 2006

(65) Prior Publication Data

US 2007/0085002 A1    Apr. 19, 2007

(30) Foreign Application Priority Data

Sep. 22, 2005    (CN)    ................... 2005 1 0037509

(51) Int. Cl.
*G01N 23/00*    (2006.01)
(52) U.S. Cl. .................. 250/306; 977/867; 977/876; 374/6; 374/137; 374/179
(58) Field of Classification Search ...... 250/306–443.1; 374/6, 137, 179; 977/867, 876
See application file for complete search history.

(56) References Cited

U.S. PATENT DOCUMENTS

| | | | |
|---|---|---|---|
| 6,566,650 B1 | 5/2003 | Hu et al. | |
| 6,668,628 B2 * | 12/2003 | Hantschel et al. | ............. 73/105 |
| 6,788,086 B2 * | 9/2004 | Hantschel et al. | ........... 324/762 |
| 7,073,937 B2 | 7/2006 | Nakayama et al. | |
| 7,109,581 B2 * | 9/2006 | Dangelo et al. | ............. 257/720 |
| 7,273,095 B2 * | 9/2007 | Li et al. | ....................... 165/185 |
| 2002/0061662 A1 * | 5/2002 | Boggild | ....................... 438/800 |
| 2003/0182993 A1 * | 10/2003 | Hantschel et al. | ............. 73/105 |
| 2004/0036403 A1 | 2/2004 | Ono et al. | |
| 2004/0123651 A1 * | 7/2004 | Hantschel et al. | ............. 73/105 |
| 2008/0193678 A1 * | 8/2008 | Han et al. | ................... 427/598 |

FOREIGN PATENT DOCUMENTS

| | | |
|---|---|---|
| JP | 2002131211 A | 5/2002 |
| JP | 2003907881 A | 3/2003 |
| JP | 2004138503 A | 5/2004 |

OTHER PUBLICATIONS

Fumihito Arai, Ultra-Small Site Temperature Sensing by Carbon Nanotubes Thermal Probe, Jan. 07, 2004, 153page, Japan

* cited by examiner

*Primary Examiner*—Jack I Berman
*Assistant Examiner*—Andrew Smyth

(57) ABSTRACT

A probe for a scanning thermal microscope includes a cantilever beam, an insulating layer, a conductive layer and a carbon nanotube. The cantilever beam includes a microtip at a distal end thereof, and the microtip has a conductive exterior portion with a pointed part. The insulating layer is formed on a part of the conductive exterior portion other than the pointed part thereof. The conductive layer is formed on the insulating layer and has a coupling portion in contact with the pointed part of the conductive exterior portion of the microtip, the coupling portion of the conductive layer and the pointed part of the conductive exterior portion thereby cooperatively form a thermocouple junction. The carbon nanotube has one end arranged on the thermocouple junction. The probe for a scanning thermal microscope increases spatial resolution of scanning thermal microscope and can prevent excessive current leakage.

9 Claims, 1 Drawing Sheet

PROBE FOR SCANNING THERMAL MICROSCOPE

TECHNICAL FIELD

The present invention relates generally to scanning thermal microscopes, and more particularly to a probe for a scanning thermal microscope.

BACKGROUND

Scanning Thermal Microscope (SThM) is a technique that uses the sample's thermal conductivity as a contrast mechanism in imaging microscopic features. A temperature sensing probe in SThM can be used for semiconductor material and device study such as locating hot spots created by short circuit defects in the sub micron regime.

Commercial SThMs use a miniature thermal resistor positioned at one end of a cantilever. If a small current is passed through the resistor, and the resistance is measured as the probe tip is scanned over a sample surface, a local temperature map of the sample is produced based on the resistance changes. If, on the other hand, a large current is passed and the resistor temperature rises significantly above that of the sample, the probe detects local changes in the local thermal conductivity of the sample. In the latter mode of operation, the thermal conductivity of the sample, as presented at the surface, is an aggregate of any thermal conductivity variations down into the sample. Changes in composition below the sample surface will therefore produce a feature in the thermal map.

One of the limitations to current usage of the above probe is that if one needs to obtain the thermal map of an electrically biased sample, the conductive parts of the sample must be passivated to prevent excessive current leakage between the tip and the conductive sample.

Another limitations to current usage of the above probe is that if one needs to obtain the thermal map of an sample with high spatial resolution, the probe tip must be have a small diameter.

What is needed, therefore, is a probe for a scanning thermal microscope with small tip diameter that can prevent excessive current leakage between the tip and the conductive sample.

SUMMARY

In accordance with an embodiment, a probe for a scanning thermal microscope includes a cantilever beam, an insulating layer, a conductive layer and a carbon nanotube. The cantilever beam includes a microtip at a distal end thereof, and the microtip has a conductive exterior portion with a pointed part. The insulating layer is formed on a part of the conductive exterior portion other than the pointed part thereof. The conductive layer is formed on the insulating layer and has a coupling portion in contact with the pointed part of the conductive exterior portion of the microtip, the coupling portion of the conductive layer and the pointed part of the conductive exterior portion thereby cooperatively form a thermocouple junction. The carbon nanotube has one end arranged on the thermocouple junction.

Other advantages and novel features will become more apparent from the following detailed description of present probe for scanning thermal microscope, when taken in conjunction with the accompanying drawing.

BRIEF DESCRIPTION OF THE DRAWING

Many aspects of the present probe for scanning thermal microscope can be better understood with reference to the following drawing. The components in the drawing are not necessarily drawn to scale, the emphasis instead being placed upon clearly illustrating the principles of the present probe for scanning thermal microscope. Moreover, in the drawing, like reference numerals designate corresponding parts throughout the several views.

DETAILED DESCRIPTION OF THE EMBODIMENT

Figure 1:
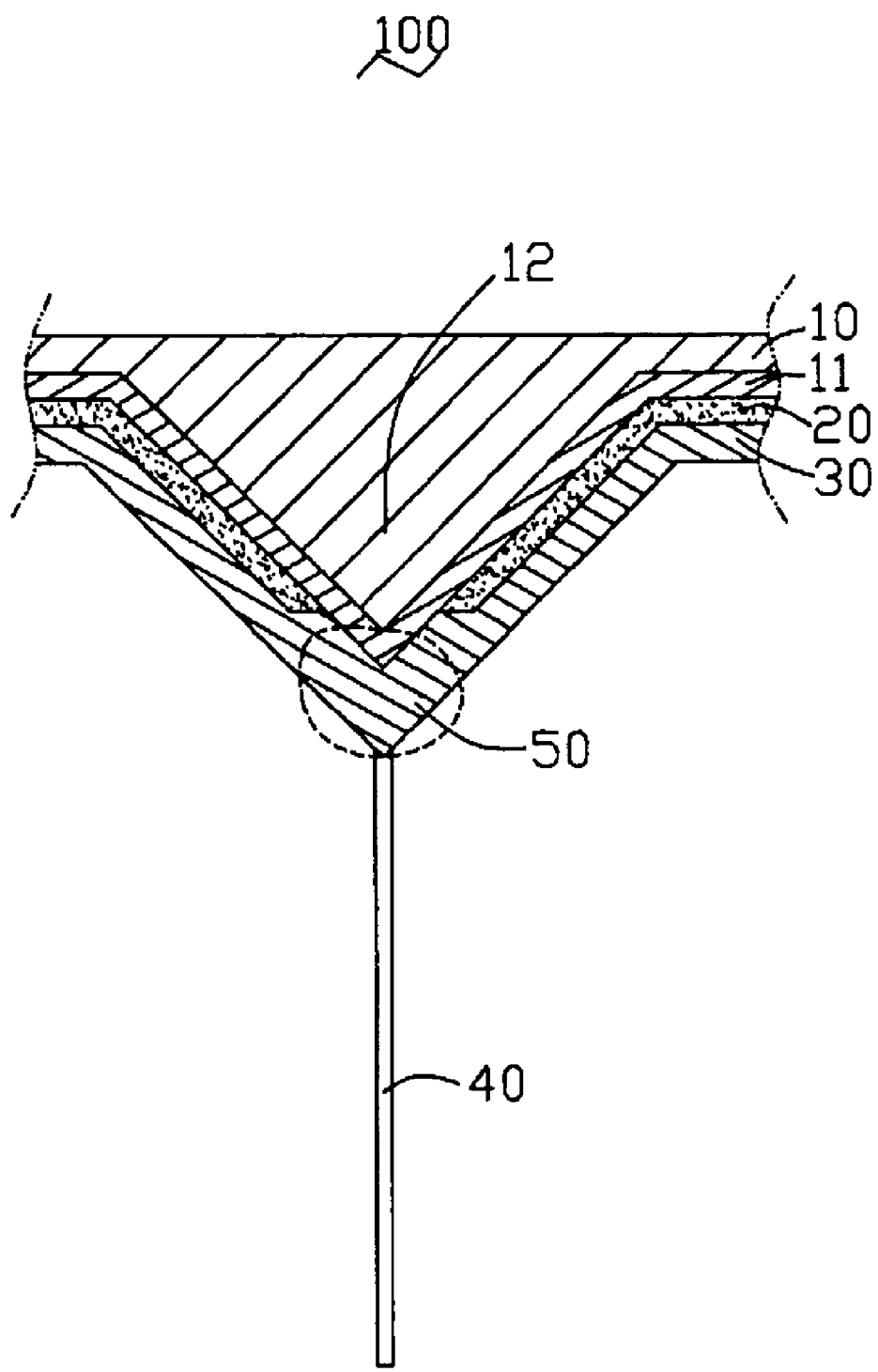
FIG. 1 is a schematic, cross-sectional view of a probe for a scanning thermal microscope according to an exemplary embodiment.

Embodiment of the present probe for scanning thermal microscope will now be described in detail below and with reference to the drawing.

Referring to FIG. 1, a probe for a scanning thermal microscope 100 according to an embodiment includes a cantilever beam 10, an insulating layer 20, a conductive layer 30 and a carbon nanotube 40. The cantilever beam 10 includes a microtip 12 at a distal end thereof, the microtip 12 has a conductive exterior portion 11 with a pointed part. The insulating layer 20 is formed on a part of the conductive exterior portion 11 other than the pointed pail thereof. The conductive layer 30 is formed on the insulating layer 20 and has a coupling portion in contact with the pointed part of the conductive exterior portion 11 of the microtip 12, the coupling portion of the conductive layer 30 and the pointed part of the conductive exterior portion 11 thereby cooperatively form a thermocouple junction 50. The carbon nanotube 40 has one end arranged on the thermocouple junction 50.

A process for manufacturing a probe of this type will be described below. In the course of the description, the structure of the probe 100 will also become apparent. The process begins with the provision of a cantilever beam 10. The cantilever beam 10 includes a microtip 12 at a distal end thereof, the microtip 12 has a conductive exterior portion 11 with a pointed part. The conductive exterior portion 11 can be integrally formed with microtip 12 and all with same conductive material. The conductive exterior portion 11 can also be deposited onto the microtip 12. The conductive exterior portion 11 includes a material selected from the group consisting of tungsten, copper, silicon, magnesium, and any combination alloy thereof.

The next step is deposition of insulating layer 20 on the conductive exterior portion 11. The insulating layer 20 has a thickness between about 80 and 120 nanometers. Suitable materials include silicon oxide and silicon nitride. The conductive layer 30 is deposited on the insulating layer 20 and has a thickness between about 40 and 80 nanometers. The conductive layer 30 includes a material selected from the group consisting of gold, nickel, chromium, and any combination alloy thereof. As can be seen in FIG. 1, the conductive exterior portion 11 and the conductive layer 30 are separated from one another by the insulating layer 20 everywhere other than the pointed part of the microtip 12. The conductive layer 30 has a coupling portion in contact with the pointed part of the conductive exterior portion 11 of the microtip 12, the coupling portion of the conductive layer 30 and the pointed part of the conductive exterior portion 11 thereby cooperatively form a thermocouple junction 50 (referring to the broken curve area of FIG. 1).

Then, a carbon nanotube 40 is disposed on the thermocouple junction 50, exactly with one end arranged on the thermocouple junction 50. Preferably, the carbon nanotube 40 is substantially perpendicular with the cantilever beam 10. The carbon nanotube 40 can be selected from the group including single-wall carbon nanotubes and multi-wall carbon nanotubes. The carbon nanotube 40 can be grown in situ on the thermocouple junction 50 by a chemical vapor deposition, attached on the thermocouple junction 50 by attraction under an electric field applied thereto or attached on the thermocouple junction 50 with an adhesive. Preferably, the carbon nanotube has a length of at least about 1 micron and a diameter of not greater than about 10 nanometers.

In present embodiment, the probe for scanning thermal microscope 100 has a carbon nanotube 40 attached, the carbon nanotube 40 has a small diameter, and can obtain the thermal map of an sample with high spatial resolution. Because the carbon nanotube 40 has a certain length, it can prevent excessive current leakage between the conductive layer 30 and the conductive sample. The carbon nanotube 40 has relative bad radial electrical conductivity and small diameter can also prevent excessive current leakage between the carbon nanotube 40 and the conductive sample. Furthermore, the probe for scanning thermal microscope 100 is brought into contact with a sample in order to acquire an image there is abrasion by the probe tip, with a carbon nanotube as the probe tip can prevent variation in the probe tip diameter.

It is understood that the above-described embodiment is intended to illustrate rather than limit the invention. Variations may be made to the embodiment without departing from the spirit of the invention. Accordingly, it is appropriate that the appended claims be construed broadly and in a manner consistent with the scope of the invention.

What is claimed is:

1. A probe for a scanning thermal microscope, comprising:
    a cantilever beam including a microtip at a distal end thereof, the microtip having a conductive exterior portion with a pointed part;
    an insulating layer formed on a part of the conductive exterior portion other than the pointed part thereof;
    a conductive layer formed on the insulating layer, the conductive layer having a coupling portion in contact with the pointed part of the conductive exterior portion of the microtip, the coupling portion of the conductive layer and the pointed part of the conductive exterior portion thereby cooperatively forming a thermocouple junction; and
    a carbon nanotube having one end arranged on the thermocouple junction.

2. The probe for a scanning thermal microscope as claimed in claim 1, wherein the conductive exterior portion is comprised of a material selected from the group consisting of tungsten, copper, silicon, magnesium, and any combination alloy thereof.

3. The probe for a scanning thermal microscope as claimed in claim 1, wherein the conductive layer is comprised of a material selected from the group consisting of gold, nickel, chromium, and any combination alloy thereof.

4. The probe for a scanning thermal microscope as claimed in claim 1, wherein the carbon nanotube is substantially perpendicular to the cantilever beam.

5. The probe for a scanning thermal microscope as claimed in claim 1, wherein the carbon nanotube is one of a single-wall carbon nanotube and a multi-wall carbon nanotube.

6. The probe for a scanning thermal microscope as claimed in claim 1, wherein the carbon nanotube is grown in situ on the thermocouple junction by a chemical vapor deposition.

7. The probe for a scanning thermal microscope as claimed in claim 1, wherein the carbon nanotube is attached on the thermocouple junction by attraction under an electric field applied thereto.

8. The probe for a scanning thermal microscope as claimed in claim 1, wherein the carbon nanotube is attached on the thermocouple junction with an adhesive.

9. The probe for a scanning thermal microscope as claimed in claim 1, wherein the carbon nanotube having a length of at least about 1 micron and a diameter of not greater than about 10 nm.

* * * * *